US012600868B2

(12) United States Patent
Li et al.

(10) Patent No.: US 12,600,868 B2
(45) Date of Patent: Apr. 14, 2026

(54) ORGANIC-INORGANIC COMPOSITE THERMAL INSULATION MEDIUM AND PREPARATION METHOD THEREOF

(71) Applicant: SHANGHAI HUZHENG INDUSTRY CO., LTD, Shanghai (CN)

(72) Inventors: Jiayi Li, Shanghai (CN); Jiaxiao Xue, Shanghai (CN)

(73) Assignee: SHANGHAI HUZHENG INDUSTRY CO., LTD, Shanghai (CN)

( * ) Notice: Subject to any disclaimer, the term of this patent is extended or adjusted under 35 U.S.C. 154(b) by 114 days.

(21) Appl. No.: 18/724,869

(22) PCT Filed: Apr. 28, 2023

(86) PCT No.: PCT/CN2023/091445
§ 371 (c)(1),
(2) Date: Jun. 27, 2024

(87) PCT Pub. No.: WO2024/007705
PCT Pub. Date: Jan. 11, 2024

(65) Prior Publication Data
US 2025/0145838 A1     May 8, 2025

(30) Foreign Application Priority Data
Jul. 6, 2022    (CN) .......................... 202210788371.5

(51) Int. Cl.
*C09D 5/18*        (2006.01)
*C09D 7/40*        (2018.01)
*C09D 7/62*        (2018.01)

(52) U.S. Cl.
CPC ................. *C09D 5/18* (2013.01); *C09D 7/62* (2018.01); *C09D 7/67* (2018.01)

(58) Field of Classification Search
CPC .......... C09D 5/32; C09D 133/00; C09D 5/18; C09D 7/62; C09D 7/65; C09D 7/67; C09D 175/04; C09D 7/61; C08K 3/22; C08K 2003/2258; C08K 9/04; B32B 17/10633
See application file for complete search history.

(56) References Cited

U.S. PATENT DOCUMENTS

2006/0178254 A1     8/2006   Takeda et al.

FOREIGN PATENT DOCUMENTS

| CN | 1742214 A | 3/2006 |
| CN | 102482146 A | 5/2012 |
| CN | 105307996 A | 2/2016 |
| CN | 108779381 A | 11/2018 |
| CN | 108864625 A | 11/2018 |
| CN | 108884375 A | 11/2018 |

*Primary Examiner* — Amber R Orlando
*Assistant Examiner* — Ryan Patrick Loughran
(74) *Attorney, Agent, or Firm* — TROUTMAN PEPPER LOCKE LLP; Christopher C. Close, Jr.

(57)                ABSTRACT

Disclosed is an organic-inorganic composite thermal insulation medium, which is a nanoparticle having a structure of $(M_x\text{-}R_n)WO_y$, where M represents a doped metal element, R represents an organic complex group, $0.3 \leq x \leq 0.7$, $2 < y < 4$, n represents a polymerization degree of the organic complex group, and $n \geq 10$; M is selected from the group consisting of an alkali metal, an alkaline earth metal, a transition metal, and a rare earth metal; and R is selected from the group consisting of pyrrole and a derivative thereof, aniline and a derivative thereof, and thiophene and a derivative thereof. In addition, also disclosed is a method for preparing the thermal insulation medium.

8 Claims, 1 Drawing Sheet

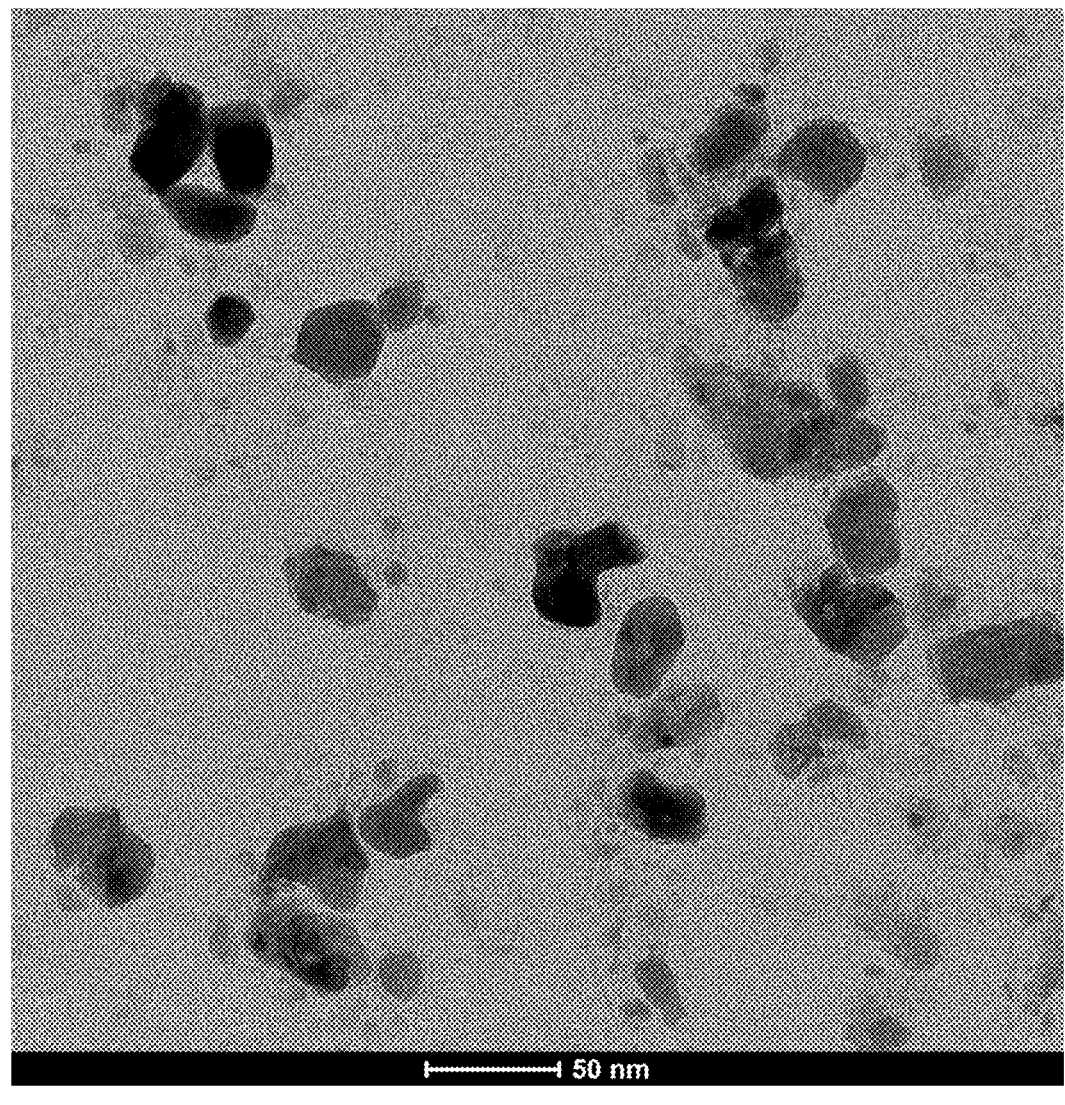

ORGANIC-INORGANIC COMPOSITE THERMAL INSULATION MEDIUM AND PREPARATION METHOD THEREOF

CROSS REFERENCE TO RELATED APPLICATION

This application is a national stage application of International Patent Application No. PCT/CN2023/091445 filed on Apr. 28, 2023, which claims priority to the Chinese Patent Application No. CN202210788371.5 entitled "ORGANIC-INORGANIC COMPOSITE THERMAL INSULATION MEDIUM AND PREPARATION METHOD THEREOF", filed with the China National Intellectual Property Administration (CNIPA) on Jul. 6, 2022. The two applications each are incorporated herein by reference in their entireties.

TECHNICAL FIELD

The present disclosure belongs to the technical field of thermal insulation media, and relates to an organic-inorganic composite thermal insulation medium and a preparation method thereof.

BACKGROUND

Efficient energy utilization is an important topic in current development. With the global warming, high-temperature weather has occurred frequently. As a result, air-conditioning facilities, which are commonly used for temperature regulation in spaces such as buildings and automobiles, tend to consume a lot of energy. The energy consumed by cooling and temperature-control devices accounts for about 20% of the total energy consumed every year. Functional materials such as thermal insulation media have emerged accordingly. In summer, the thermal insulation media could absorb infrared light and ultraviolet light, convert them into heat or reflection, and transfer heat to the air in the forms of heat conduction and heat convection, with 50% of the heat being transferred to the outdoor air and the remaining heat being transferred to the indoor air, such that the heat transferred to the indoor air is reduced by about half, which enables the energy consumption of devices such as air conditioners to be reduced by about half, thus achieving a prominent energy-saving effect. In winter, the indoor heat is transferred to the outdoor air in the form of heat radiation; the thermal insulation media could absorb or reflect infrared light back indoors, such that about half of the heat is returned to the indoor air in the form of heat convection, reducing heat loss and also achieving an energy-saving effect.

Currently, most of the thermal insulation media have a single inorganic or organic structure. Chinese patent publication No. CN108884375A discloses a series of infrared absorbing materials including one or more transition metals and ligands thereof (including one or more elements selected from the group consisting of B, C, N, O, F, Al, Si, P, S, Cl, Se, and Te), which could be used in thermoplastic resins to prepare infrared-absorbing transparent substrates. Chinese patent publication No. CN108779381A discloses a near-infrared-shielding ultrafine particle dispersion, which exhibits excellent near-infrared-shielding and blue fog-inhibiting effects due to the compounding of tungsten oxide $MXWYOZ$ ultrafine particles. Chinese patent publication No. CN1742214A discloses a near-infrared absorbing compound based on a bisphenyl p-phenylenediamine salt derivative structure, without harmful substances such as antimony and arsenic, which has an infrared absorption function, and exhibits excellent heat resistance. These structures disclosed in the above documents all have excellent infrared absorption characteristics.

On the basis of related studies, a thermal insulation medium nanomaterial with improved properties could be prepared through the further design and construction to combine the advantages of organic and inorganic structures.

SUMMARY

In view of the deficiencies in the prior art, the present disclosure provides an organic-inorganic composite thermal insulation medium that could be easily prepared and has excellent heat resistance, environmental friendliness, and high thermal insulation performance, and the present disclosure further provides a method for preparing the organic-inorganic composite thermal insulation medium.

To solve the above technical problem, the present disclosure provides the following technical solutions:

Provided is an organic-inorganic composite thermal insulation medium, which is a nanoparticle having a structure of $(M_x\text{-}R_n)WO_y$, wherein M represents a doped metal element, R represents an organic complex group, $0.3 \leq x \leq 0.7$, $2 < y < 4$, n represents a polymerization degree of the organic complex group, and $n \geq 10$.

In some embodiments, the nanoparticle has a particle size of 10 nm to 50 nm.

In some embodiments, the doped metal element is selected from the group consisting of an alkali metal, an alkaline earth metal, a transition metal, and a rare earth metal.

In some embodiments, the organic complex group R is selected from the group consisting of pyrrole and a derivative thereof, aniline and a derivative thereof, and thiophene and a derivative thereof.

The present disclosure further provides a method for preparing the organic-inorganic composite thermal insulation medium as described in the above solutions, including the following steps:

(1) dispersing 1 part by mass of a tungstate in a water/ethanol (1/1, v/v) system to obtain a solution with a concentration of 0.05 mol/L to 0.5 mol/L, adding 0.05 to 0.5 parts by mass of a dilute acid solution with a concentration of 0.05 mol/L to 0.1 mol/L to the solution to obtain a solution system, and subjecting the solution system to ultrasonic treatment for 10 min to 30 min and aging for 12 h to 24 h to obtain a product;

(2) subjecting the product to filtering and then washing with water to obtain a washed product, dispersing the washed product and 0.1 to 0.5 parts by mass of a metal salt sequentially in 5 to 10 parts by mass of deionized water, then adding 0.5 to 3 parts by mass of a polyol thereto and stirring for 0.5 h to 2 h to obtain a mixture, and transferring the mixture to a pressure reactor and conducting a first reaction for 12 h to 24 h at a pressure of 1 MPa to 5 MPa and a temperature of 100° C. to 150° C. to obtain a reaction product;

(3) subjecting the reaction product to filtering and then washing with water to obtain a washed reaction product, and dispersing the washed reaction product in 5 to 10 parts by mass of a solvent, then adding 0.05 to 0.2 part by mass of an active monomer thereto to obtain a mixed system, adjusting the mixed system to a pH of 2 to 5 by using hydrochloric acid and conducting a pre-reaction for 1 h to 3 h to obtain a pre-reaction system, and adding 0.01 to 0.1 parts by mass of an oxidant to the pre-reaction system and conducting a second reaction for 2 h to 5 h at a temperature of 50° C. to 80° C. to obtain a reaction system; and (4) subjecting the reaction system to filtering and then washing with ethanol to obtain a washed reaction system, and vacuum-drying the washed reaction system for 24 h and then conducting a treatment in a tube furnace at a temperature of 200° C. to 400° C. for 1 h to 5 h to obtain the organic-inorganic composite thermal insulation medium.

In some embodiments, in step (1), the tungstate is selected from the group consisting of sodium tungstate, potassium tungstate, and ammonium tungstate.

In some embodiments, in step (1), the dilute acid solution is selected from the group consisting of dilute hydrochloric acid and dilute nitric acid.

In some embodiments, in step (2), the metal salt is selected from the group consisting of a soluble chloride, sulfate, and nitrate of the doped metal element.

In some embodiments, in step (2), the polyol is selected from the group consisting of ethylene glycol, 1,3-propanediol, and glycerol.

In some embodiments, in step (3), the active monomer is selected from the group consisting of pyrrole and a derivative thereof, aniline and a derivative thereof, and thiophene and a derivative thereof.

In some embodiments, in step (3), the oxidant is selected from the group consisting of iron chloride and potassium chlorate.

Compared with the prior art, the organic-inorganic composite thermal insulation nano-medium according to the present disclosure enables electrons to have strong mobility in the nanoparticles due to the conjugation action of a macromolecular organic structure with an inorganic compound, thereby enhancing an infrared absorption effect, and thus allowing an efficient thermal insulation effect. Furthermore, in the present disclosure, the composite thermal insulation medium is subjected to a crosslinking heat treatment to obtain organic-organic and organic-inorganic tightly-connected structures, which further guarantees the stability and weather resistance of the composite thermal insulation medium. Moreover, the nanoscale of the thermal insulation medium could further enhance an absorption activity of the composite thermal insulation medium and maintain the transparency of products. Therefore, the products prepared with the organic-inorganic composite thermal insulation nano-medium according to the present disclosure, such as a coating, a slurry, and a film, have the following outstanding characteristics: a strong infrared absorption capacity, namely, high thermal insulation performance, a prominent weather resistance and stability. In addition, these products could maintain high transparency and high definition due to the nanoscale of the thermal insulation medium, which ensures the qualities of the products and satisfies the functional requirements of the products.

Further, the preparation method according to the present disclosure also has characteristics such as universality and simplicity, prominent environmental friendliness, and low cost.

BRIEF DESCRIPTION OF THE DRAWING

FIGURE is a transmission electron microscopy (TEM) image of the organic-inorganic composite thermal insulation nano-medium prepared in Example 1.

DETAILED DESCRIPTION OF THE EMBODIMENTS

The present disclosure will be further described below in conjunction with specific examples. These examples should be understood as merely illustrating the present disclosure rather than limiting the scope of the present disclosure. After reading the content of the present disclosure, persons skilled in the art can make various changes or modifications to the present disclosure, and these equivalent changes and modifications also fall within the scope defined by the claims of the present disclosure.

All raw materials used in the following examples of the present disclosure are commercially-available products, unless otherwise specified.

Example 1

(1) 100 g of sodium tungstate was taken and dispersed in 3 L of a water/ethanol system (with an equal volume ratio of water to ethanol) to obtain a solution, 16 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 25 g of yttrium nitrate were dispersed sequentially in 1 L of deionized water, and 67 g of ethylene glycol was then added thereto and stirred for 1 h to obtain a mixture. The mixture was transferred to a pressure reactor, and subjected to reaction for 24 h at a pressure of 2 MPa and a temperature of 120° C. to obtain a reaction product.

(3) The reaction product was filtered and washed with water to obtain a washed reaction product. The washed reaction product was dispersed in 800 mL of water, and 20 g of pyrrole was then added thereto to obtain a mixed system. The mixed system was adjusted to a pH of 3 by using hydrochloric acid and then subjected to pre-reaction for 1 h to obtain a pre-reaction system. 8 g of iron chloride was added into the pre-reaction system, and a resulting system was subjected to reaction at 75° C. for 3 h to obtain a reaction system.

(4) The reaction system was filtered and washed with ethanol to obtain a washed reaction system. The washed reaction system was vacuum-dried for 24 h and then placed in a tube furnace and treated therein under a nitrogen atmosphere at 220° C. for 3 h to obtain the organic-inorganic composite thermal insulation medium. The organic-inorganic composite thermal insulation medium has a morphology as shown in FIGURE, with a nanoparticle structure of about 30 nm.

Example 2

(1) 110 g of potassium tungstate was taken and dispersed in 3 L of a water/ethanol system (with an equal volume ratio of water to ethanol) to obtain a solution, 18 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 14 g of nickel chloride were dispersed sequentially in 800 mL of deionized water, and 58 g of 1,3-propanediol was then added thereto and stirred for 1 h to obtain a mixture. The mixture was transferred to a pressure reactor, and subjected to reaction for 24 h at a pressure of 1.5 MPa and a temperature of 110° C. to obtain a reaction product.

(3) The reaction product was filtered and washed with water to obtain a washed reaction product. The washed reaction product was dispersed in 800 mL of water, and 22 g of aniline was then added thereto to obtain a mixed system. The mixed system was adjusted to a pH of 2.5 by using hydrochloric acid, and then subjected to pre-reaction for 1 h to obtain a pre-reaction system. 10 g of potassium chlorate was added into the pre-reaction system, and a resulting system was subjected to reaction at 70° C. for 4 h to obtain a reaction system.

(4) The reaction system was filtered and washed with ethanol to obtain a washed reaction system. The washed reaction system was vacuum-dried for 24 h, and then placed in a tube furnace and treated therein under a nitrogen atmosphere at 220° C. for 2 h to obtain the organic-inorganic composite thermal insulation medium.

Example 3

(1) 95 g of ammonium tungstate was taken and dispersed in 3 L of a water/ethanol system (with an equal volume ratio of water to ethanol) to obtain a solution, 15 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 28 g of cerium nitrate were dispersed sequentially in 1 L of deionized water, and 70 g of 1,3-propanediol was then added thereto and stirred for 1 h to obtain a mixture. The mixture was transferred to a pressure reactor, and subjected to reaction for 24 h at a pressure of 1.5 MPa and a temperature of 130° C. to obtain a reaction product.

(3) The reaction product was filtered and washed with water to obtain a washed reaction product. The washed reaction product was dispersed in 800 mL of water, and 22 g of pyrrole was then added thereto to obtain a mixed system. The mixed system was adjusted to a pH of 3 by using hydrochloric acid, and then subjected to pre-reaction for 1 h to obtain a pre-reaction system. 9 g of iron chloride was added into the pre-reaction system, and a resulting system was subjected to reaction at 70° C. for 4 h to obtain a reaction system.

(4) The reaction system was filtered and washed with ethanol to obtain a washed reaction system. The washed reaction system was vacuum-dried for 24 h, and then placed in a tube furnace and treated therein under a nitrogen atmosphere at 280° C. for 1 h to obtain the organic-inorganic composite thermal insulation medium.

Example 4

(1) 100 g of sodium tungstate was taken and dispersed in 3 L of a water/ethanol system (with an equal volume ratio of water to ethanol) to obtain a solution, 17 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 27 g of molybdenum nitrate were dispersed sequentially in 800 mL of deionized water, and 72 g of ethylene glycol was then added thereto and stirred for 1 h to obtain a mixture. The mixture was transferred to a pressure reactor, and subjected to reaction for 24 h at a pressure of 2 MPa and a temperature of 120° C. to obtain a reaction product.

(3) The reaction product was filtered and washed with water to obtain a washed reaction product. The washed reaction product was dispersed in 800 mL of water, and 23 g of aniline was then added thereto to obtain a mixed system. The mixed system was adjusted to a pH of 3 by using hydrochloric acid, and then subjected to pre-reaction for 1 h to obtain a pre-reaction system. 9 g of potassium chlorate was added to the pre-reaction system, and a resulting system was subjected to reaction at 75° C. for 4 h to obtain a reaction system.

(4) The reaction system was filtered and washed with ethanol to obtain a washed reaction system. The washed reaction system was vacuum-dried for 24 h, and then placed in a tube furnace and treated thereto under a nitrogen atmosphere at 260° C. for 2 h to obtain the organic-inorganic composite thermal insulation medium.

Example 5

(1) 110 g of potassium tungstate was taken and dispersed in 3 L of a water/ethanol system (with an equal volume ratio of water to ethanol) to obtain a solution, 20 mL of 0.1 mol/L dilute hydrochloric acid was added into the solution to obtain a solution system, and the solution system was subjected to ultrasonic treatment for 30 min and aging for 12 h to obtain a product.

(2) The product was filtered and washed with water to obtain a washed product. The washed product and 17 g of copper chloride were dispersed sequentially in 800 mL of deionized water, and 74 g of glycerol was then added thereto and stirred for 1 h to obtain a mixture. The mixture was transferred to a pressure reactor, and subjected to reaction for 24 h at a pressure of 2 MPa and a temperature of 120° C. to obtain a reaction product.

(3) The reaction product was filtered and washed with water to obtain a washed reaction product. The washed reaction product was dispersed in 800 mL of water, and 22 g of thiophene was then added thereto to obtain a mixed system. The mixed system was adjusted to a pH of 2 by using hydrochloric acid, and then subjected to pre-reaction for 1 h to obtain a pre-reaction system. 10 g of iron chloride was added to the pre-reaction system, and a resulting system was subjected to second reaction at 75° C. for 3 h to obtain a reaction system.

(4) The reaction system was filtered and washed with ethanol to obtain a washed reaction system. The washed reaction system was vacuum-dried for 24 h and then placed in a tube furnace and treated thereto under a nitrogen atmosphere at 230° C. for 2 h to obtain the organic-inorganic composite thermal insulation medium.

Example 6

(1) 110 g of sodium tungstate was taken and dispersed in 3 L of a water/ethanol system (with an equal volume ratio of water to ethanol) to obtain a solution, 21 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 30 g of zinc nitrate were dispersed successively in 800 mL of deionized water, and 62 g of 1,3-propanediol was then added thereto and stirred for 1 h to obtain a mixture. The mixture was transferred to a pressure reactor, and subjected to reaction for 24 h at a pressure of 1.5 MPa and a temperature of 120° C. to obtain a reaction product.

(3) The reaction product was filtered and washed with water to obtain a washed reaction product. The washed reaction product was dispersed in 800 mL of water, and 22 g of pyrrole was then added thereto to obtain a mixed system. The mixed system was adjusted to a pH of 2.5 by using hydrochloric acid, and then subjected to pre-reaction for 1 h to obtain a pre-reaction system. 9 g of potassium chlorate was added to the pre-reaction system, and a resulting system was subjected to reaction at 70° C. for 4 h to obtain a reaction system.

(4) The reaction system was filtered and washed with ethanol to obtain a washed reaction system. The washed reaction system was vacuum-dried for 24 h and then placed in a tube furnace and treated therein under a nitrogen atmosphere at 230° C. for 2 h to obtain the organic-inorganic composite thermal insulation medium.

Example 7

(1) 110 g of potassium tungstate was taken and dispersed in 3 L of a water/ethanol system (with an equal volume ratio of water to ethanol) to obtain a solution, 20 mL of 0.1 mol/L dilute hydrochloric acid was added into the solution to obtain a solution system, and the solution system was subjected to ultrasonic treatment for 30 min and then aging for 12 h to obtain a product.

(2) The product was filtered and washed with water to obtain a washed product. The washed product and 32 g of lanthanum nitrate were dispersed successively in 800 mL of deionized water, and 65 g of ethylene glycol was then added

Test Example (1) The organic-inorganic composite thermal insulation media prepared in Examples 1 to 7 each were dispersed in ethyl acetate, with a content of 20%.

(2) An acrylic resin (with a solid content of 40%), ethyl acetate, and an organic-inorganic composite thermal insulation medium solution were mixed at a ratio of 4:4:2 to obtain a mixture.

(3) The mixture was evenly coated onto a surface of a PET film with a coating thickness of about 10 μm to form a thermal insulation coating.

(4) The thermal insulation coating was immediately covered with a PET film to obtain a three-layer composite film.

(4) The three-layer composite film was dried in an oven at 80° C. for 5 min and then cooled for later use.

(5) The transmittance of each composite film in visible and infrared bands was measured by a spectrophotometer and a light transmittance tester. The transmittance was measured at two typical wavelengths of 950 nm and 1,400 nm in the infrared band to characterize a thermal insulation rate. The haze was tested by a haze meter to characterize a definition.

Test results are shown in Table 1. It can be seen from Table 1 that the organic-inorganic composite thermal insulation medium prepared in each example has an excellent visible light transmittance, infrared band-blocking rate, and definition, indicating that the organic-inorganic composite thermal insulation media prepared in Examples 1 to 7 have excellent transparency, thermal insulation, and definition, thereby exhibiting a promising application prospect in fields such as films, slurries, and coatings.

TABLE 1

| Infrared blocking rates of the organic-inorganic composite thermal insulation media prepared in Examples 1 to 7 | | | | | | | |
|---|---|---|---|---|---|---|---|
| | Example 1 | Example 2 | Example 3 | Example 4 | Example 5 | Example 6 | Example 7 |
| Infrared 950 nm | 85% | 87% | 85% | 87% | 85% | 87% | 87% |
| blocking rate 1400 nm | 92% | 96% | 92% | 96% | 92% | 96% | 96% |
| Visible light transmittance | 92% | 89% | 90% | 88% | 86% | 86% | 91% |
| Haze | 1.5% | 1.9% | 1.5% | 1.6% | 1.8% | 1.8% | 1.8% | thereto and stirred for 1 h to obtain a mixture. The mixture was transferred to a pressure reactor, and subjected to reaction for 24 h at a pressure of 2 MPa and a temperature of 120° C. to obtain a reaction product.

(3) The reaction product was filtered and washed with water to obtain a washed reaction product. The washed reaction product was dispersed in 800 mL of water, and 22 g of aniline was then added thereto to obtain a mixed system. The mixed system was adjusted to a pH of 2.5 by using hydrochloric acid, and then subjected to pre-reaction for 1 h to obtain a pre-reaction system. 11 g of iron chloride was added to the pre-reaction system, and a resulting system was subjected to reaction at 75° C. for 4 h to obtain a reaction system.

(4) The reaction system was filtered and washed with ethanol to obtain a washed reaction system. The washed reaction system was vacuum-dried for 24 h and then placed in a tube furnace and treated thereto under a nitrogen atmosphere at 260° C. for 2 h to obtain the organic-inorganic composite thermal insulation medium.

The above are merely preferred embodiments of the present disclosure. It should be noted that a person of ordinary skill in the art may further make several improvements and modifications without departing from the concept of the present disclosure, but such improvements and modifications should be deemed as falling within the scope of the present disclosure.

What is claimed is:

1. An organic-inorganic composite thermal insulation medium, which is a nanoparticle having a structure of $(M_x\text{-}R_n)WO_y$, and having a particle size of 10 nm to 50 nm; wherein M represents a doped metal element, R represents an organic complex group, $0.3 \le x \le 0.7$, $2 < y < 4$, n represents a polymerization degree of the organic group, and $n \ge 10$; the doped metal element is selected from the group consisting of an alkali metal, an alkaline earth metal, a transition metal, and a rare earth metal; and R is selected from the group consisting of pyrrole and a derivative thereof, aniline and a derivative thereof, and thiophene and a derivative thereof.

2. A method for preparing the organic-inorganic composite thermal insulation medium according to claim 1, comprising the following steps:

(1) dispersing 1 part by mass of a tungstate in a water/ethanol (1/1, v/v) system to obtain a solution with a concentration of 0.05 mol/L to 0.5 mol/L, adding 0.05 to 0.5 parts by mass of a dilute acid solution with a concentration of 0.05 mol/L to 0.1 mol/L to the solution to obtain a solution system, and subjecting the solution system to ultrasonic treatment for 10 min to 30 min and aging for 12 h to 24 h to obtain a product;

(2) subjecting the product obtained in step (1) to filtering and then washing with water to obtain a washed product, dispersing the washed product and 0.1 to 0.5 parts by mass of a metal salt sequentially in 5 to 10 parts by mass of deionized water, then adding 0.5 to 3 parts by mass of a polyol thereto and stirring for 0.5 h to 2 h to obtain a mixture, and transferring the mixture to a pressure reactor and conducting a reaction for 12 h to 24 h at a pressure of 1 MPa to 5 MPa and a temperature of 100° C. to 150° C. to obtain a reaction product;

(3) subjecting the reaction product obtained in step (2) to filtering and then washing with water to obtain a washed reaction product, and dispersing the washed reaction product in 5 to 10 parts by mass of a solvent, then adding 0.05 to 0.2 parts by mass of an active monomer thereto to obtain a mixed system, adjusting the mixed system to a pH of 2 to 5 by using hydrochloric acid and conducting a pre-reaction for 1 h to 3 h to obtain a pre-reaction system, and adding 0.01 to 0.1 parts by mass of an oxidant to the pre-reaction system and conducting a reaction for 2 h to 5 h at a temperature of 50° C. to 80° C. to obtain a reaction system; and (4) subjecting the reaction system obtained in step (3) to filtering and then washing with ethanol to obtain a washed reaction system, and vacuum-drying the washed reaction system for 24 h and conducting a treatment in a tube furnace at a temperature of 200° C. to 400° C. for 1 h to 5 h under a nitrogen atmosphere to obtain the stable organic-inorganic composite thermal insulation medium.

3. The method for preparing the organic-inorganic composite thermal insulation medium according to claim 2, wherein in step (1), the tungstate is selected from the group consisting of sodium tungstate, potassium tungstate, and ammonium tungstate.

4. The method for preparing the organic-inorganic composite thermal insulation medium according to claim 2, wherein in step (1), the dilute acid solution is selected from the group consisting of dilute hydrochloric acid and dilute nitric acid.

5. The method for preparing the organic-inorganic composite thermal insulation medium according to claim 2, wherein in step (2), the polyol is selected from the group consisting of ethylene glycol, 1,3-propanediol, and glycerol.

6. The method for preparing the organic-inorganic composite thermal insulation medium according to claim 2, wherein in step (3), the oxidant is selected from the group consisting of iron chloride and potassium chlorate.

7. The method for preparing the organic-inorganic composite thermal insulation medium according to claim 2, wherein in step (2), the metal salt is selected from the group consisting of a soluble chloride of, sulfate of, and nitrate of the doped metal element.

8. The method for preparing the organic-inorganic composite thermal insulation medium according to claim 2, wherein in step (3), the active monomer is selected from the group consisting of pyrrole and a derivative thereof, aniline and a derivative thereof, and thiophene and a derivative thereof.

* * * * *